United States Patent
O'Brien et al.

(10) Patent No.: US 11,544,664 B2
(45) Date of Patent: Jan. 3, 2023

(54) SYSTEM AND METHODS FOR TRACKING AN ITEM IN A DISTRIBUTED ENVIRONMENT

(71) Applicant: Walmart Apollo, LLC, Bentonville, AR (US)

(72) Inventors: John Jeremiah O'Brien, Farmington, AR (US); Daniel Wayne Young, Rogers, AR (US); Richard Carl McSorley, Jr., Bentonville, AR (US); Christopher Heeney, Bella Vista, AR (US); Joseph Jurich, Jr., Molino, FL (US); Bruce W. Wilkinson, Rogers, AR (US); Todd Davenport Mattingly, Bentonville, AR (US); Donald High, Noel, MO (US); Robert Cantrell, Herndon, VA (US); Brian Gerard McHale, Oldham (GB)

(73) Assignee: Walmart Apollo, LLC, Bentonville, AR (US)

(*) Notice: Subject to any disclaimer, the term of this patent is extended or adjusted under 35 U.S.C. 154(b) by 816 days.

(21) Appl. No.: 16/361,058

(22) Filed: Mar. 21, 2019

(65) Prior Publication Data
US 2019/0303843 A1    Oct. 3, 2019

Related U.S. Application Data

(60) Provisional application No. 62/646,132, filed on Mar. 21, 2018.

(51) Int. Cl.
*G06Q 10/08* (2012.01)
*H04L 9/06* (2006.01)
*H04L 9/00* (2022.01)

(52) U.S. Cl.
CPC ......... *G06Q 10/087* (2013.01); *H04L 9/0618* (2013.01); *H04L 9/50* (2022.05)

(58) Field of Classification Search
CPC . G06Q 10/087; H04L 9/0618; H04L 2209/38; H04L 9/3239
USPC .......................................................... 705/28
See application file for complete search history.

(56) References Cited

U.S. PATENT DOCUMENTS

| | | | |
|---|---|---|---|
| 2011/0016318 A1* | 1/2011 | Syngkon | H04L 9/3247 340/572.1 |
| 2017/0083860 A1* | 3/2017 | Sriram | G06Q 10/0833 |
| 2017/0262862 A1* | 9/2017 | Aljawhari | G06F 16/242 |
| 2017/0331896 A1 | 11/2017 | Holloway et al. | |

(Continued)

FOREIGN PATENT DOCUMENTS

WO    2019/081919 A1    5/2019

OTHER PUBLICATIONS

International Preliminary Report on Patentability for Application No. PCT/US2019/023460, dated Oct. 1, 2020, 7 pages.

(Continued)

*Primary Examiner* — Garcia Ade
(74) *Attorney, Agent, or Firm* — Fitch, Even, Tabin & Flannery LLP (57) ABSTRACT

A method for tracking an item in a distributed environment is provided. At least one node in a network adds a new block to a first cryptographically verifiable ledger represented by a first sequence of blocks that is stored in one or more non-transitory computer-readable media. The new block added to the first cryptographically verifiable ledger contains a component identifier and a hash of a previous block in the first sequence of blocks. The at least one node in the network adds a new block to a second cryptographically verifiable ledger represented by a second sequence of blocks that is stored in the one or more non-transitory computer-readable media. The new block added to the second cryptographically (Continued)

verifiable ledger contains a destination identifier, the first sequence of blocks, and a hash of a previous block in the second sequence of blocks.

21 Claims, 10 Drawing Sheets

(56) References Cited

U.S. PATENT DOCUMENTS

| | | | |
|---|---|---|---|
| 2019/0089525 A1* | 3/2019 | Roets | H04L 9/3239 |
| 2021/0248514 A1* | 8/2021 | Cella | G06Q 30/0278 |
| 2021/0342836 A1* | 11/2021 | Cella | H04L 67/12 |

OTHER PUBLICATIONS

Abeyratne et al., Blockchain Ready Manufacturing Supply Chain Using Distributed Ledger Ure I: International Journal of Research in Engineering and Technology. Sep. 2016;5(9):1-10.

Ambrosus, White Paper Retrieved online at: https://ambrosus.eom/#tech-docs. Ambrosus Technologies GmbH 37 pages, Mar. 15, 2018.

Bookingbug.com, 5 Ways Blockchain Will Change The Face of Retail. Retrieved online at: https://www.bookingbug.com/blog/5-ways-blockchain-will-change-the-face-of-retail/. 7 pages, (2017).

Camerinelli, Blockchain in the Supply Chain. Retrieved online at: https://www.finextra.com/blogposting/12597/blockchain-in-the-supply-chain. 6 pages, May 13, 2016.

Deloitte, Using blockchain to drive supply chain innovation. A series exploring Industry 4.0 technologies and their potential impact for enabling digital supply networks in manufacturing. Deloitte Development LLC, 12 pages, (2017).

Herzberg, Blockchain: the solution for transparency in product supply chain. Retrieved online at: https://www.provenance.org/whitepaper. 21 pages, Nov. 21, 2015.

International Search Report and Written Opinion for Application No. PCT/US2019/023460, dated Jun. 7, 2019, 9 pages.

* cited by examiner

SYSTEM AND METHODS FOR TRACKING AN ITEM IN A DISTRIBUTED ENVIRONMENT

CROSS-REFERENCE TO RELATED PATENT APPLICATIONS

This application claims priority to U.S. Provisional Application No. 62/646,132, filed on Mar. 21, 2018, the content of which is hereby incorporated by reference in its entirety.

BACKGROUND

Companies routinely attempt to track items, such as products, during production and distribution.

BRIEF DESCRIPTION OF THE FIGURES

Illustrative embodiments are shown by way of example in the accompanying figures and should not be considered as a limitation of the present disclosure. The accompanying figures, which are incorporated in and constitute a part of this specification, illustrate one or more embodiments of the present disclosure and, together with the description, help to explain the present disclosure. In the figures.

DETAILED DESCRIPTION

Described in detail herein are systems and methods for tracking an item in a distributed environment. The distributed environment may include, for example, an assembly chain and a supply chain. The system comprises one or more computer-readable media, at least one assembly machine associated with at least one assembly location within an assembly chain, at least one receiving machine associated with at least one destination location within a supply chain, and at least one node in a network. In an exemplary embodiment, a portion of the supply chain includes at least one of a distribution center, a warehouse, a store, or a checkout at the store. Each assembly machine can be configured to add a component to an item. Each receiving machine is configured to receive the item. The at least one node is communicatively coupled to the one or more computer-readable media, the at least one assembly machine, and the at least one receiving machine.

The at least one node receives, from the at least one assembly machine, a component identifier for a component added to the item by the at least one assembly machine. The at least one node adds a new block to a first distributed cryptographically verifiable ledger represented by a first sequence of blocks that is stored in one or more non-transitory computer-readable media. A distributed cryptographically verifiable ledger is a database held and updated independently by each node. The new block added to the first cryptographically verifiable ledger contains the component identifier and a hash of a previous block in the first sequence of blocks.

The at least one node receives, from the at least one receiving machine, a destination identifier for the item. The at least one node adds a new block to a second cryptographically verifiable ledger represented by a second sequence of blocks that is stored in the one or more non-transitory computer-readable media. The new block added to the second cryptographically verifiable ledger contains the destination identifier and a hash of a previous block in the second sequence of blocks. In some embodiments, the at least one node retrieves, from the one or more non-transitory computer-readable media, the first sequence of blocks, and adds to the new block the first sequence of blocks. Consequently, each block will contain a destination and component information. In alternative embodiments, the first sequence of blocks is added to a beginning of the second sequence of blocks, such that the component information is followed by the destination information.

In an exemplary embodiment, the component identifier includes at least one of an identifier of a component or a raw material associated with the item, an amount of a raw material included in the item, distance traveled for a component or a raw material to arrive at an assembly location, transportation information from a source of a component or a raw material to an assembly location, carbon data associated with a component or a raw material, source information for a component or a raw material, or a geographic location of an assembly location In an exemplary embodiment, the destination identifiers includes at least one of a geographic location of a destination location, transportation information associated with traveling between destination locations, distance traveled between destination locations, carbon data associated with traveling between destination locations, date of a sale of the item, a geographic location of the sale of the item, an identifier of a buyer of the item, or a price paid for the item.

In an exemplary embodiment, the assembly machine is an autonomous computing device within a manufacturing line, the autonomous computing device controlling a component or an amount of raw material added to the item.

In some embodiments, the at least one node is further configured to receive, from a user computing device, a query associated with one or more components of the item. In response to the query, the at least one node retrieves, from the second cryptographically verifiable ledger, one or more component identifiers associated with the query. The at least one node transmits the one or more component identifiers to the user computing device.

In further embodiments, the at least one node is further configured to receive, from a user computing device, a query associated with one or more destination locations. In response to the query, the at least one node retrieves, from the second cryptographically verifiable ledger, one or more destination identifiers associated with the query. The at least one node transmits the one or more destination identifiers to the user computing device.

As used herein, an assembly machine may be a semi or fully autonomous robot used to assemble and manufacture items and products. Assembly machines may include special purpose machinery, automation systems, and/or semi or fully automated production lines.

As used herein, a receiving machine may include a semi or fully autonomous robot or computing device at a destination location associated with tracking a location of an item or product and/or receipt of the item or product at a location. Receiving machines may include scanners and trackers configured to track the item or product as it moves locations. Receiving machines may also include check-out stations at a retail facility.

The systems and methods described herein create indelible records of component and transportation information for items that cannot be changed; furthermore, the record's authenticity can be verified using the distributed cryptographically verifiable ledgers (e.g., a blockchain) instead of a single centralized authority. With the distributed database and peer-to-peer verification of a blockchain system, users of the system, such as customers, can each have confidence in the authenticity and accuracy of the record stored in the blockchain. Once a block is formed, the block cannot be changed, thereby securing the block from tampering.

Figure 1:
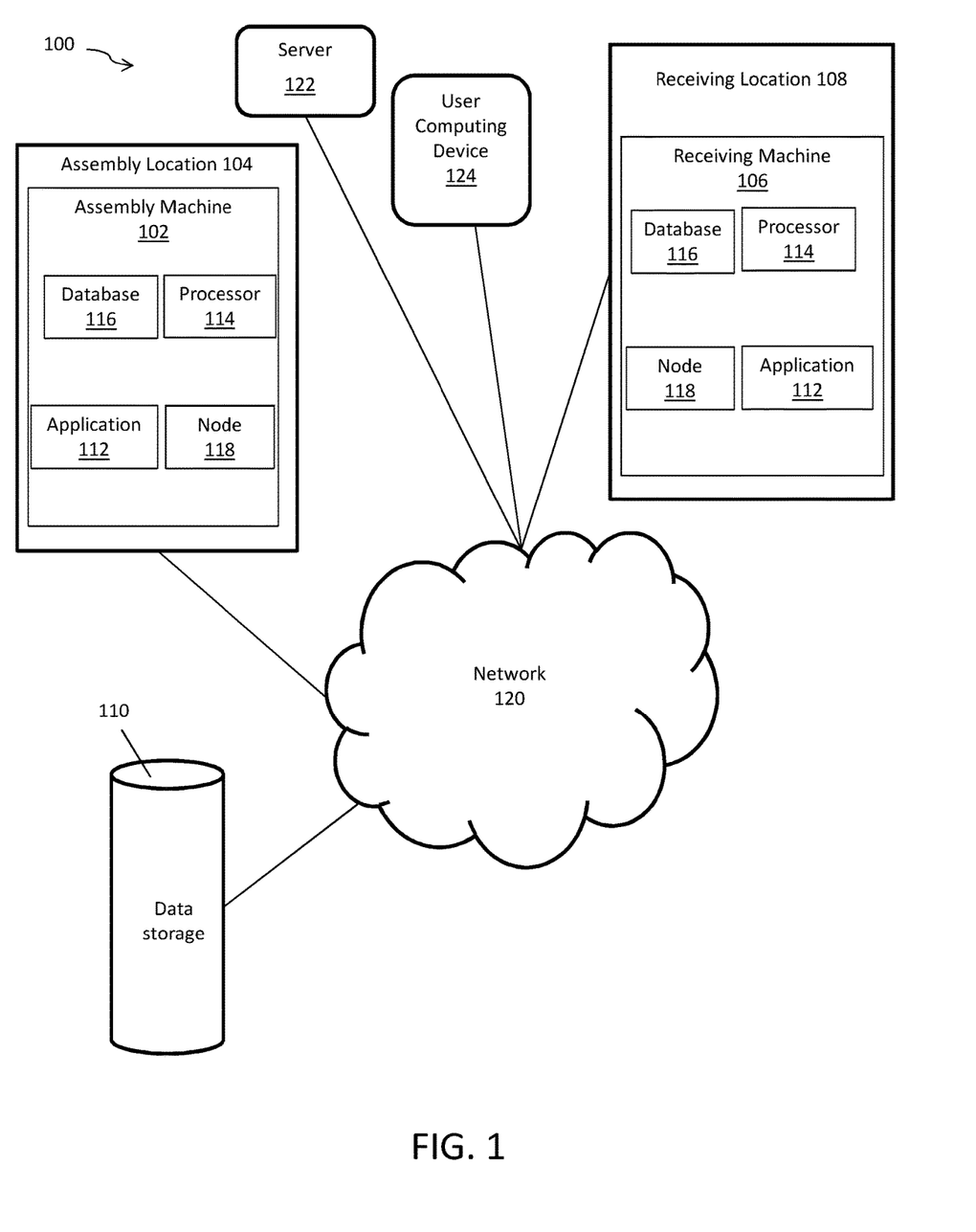
FIG. 1 depicts a block diagram illustrating components of a system for tracking an item through an assembly chain and/or a supply chain in accordance with an exemplary embodiment.

FIG. 1 depicts a block diagram illustrating components of a system 100 for tracking an item through an assembly chain and a supply chain, in accordance with an exemplary embodiment. The system 100 includes at least one assembly machine 102 associated with at least one assembly location 104 within an assembly chain and at least one receiving machine 106 associated with at least one receiving (or destination) location 108 within a supply chain. In additional embodiments as described below, the system 100 may include a data storage 110 and/or a central computing server 122.

The assembly machine 102 and the receiving machine 106 can include one or more computing devices executing one or more applications 112 to facilitate generation of identifiers, as described herein. The assembly machine 102 and/or the receiving machine 106 can include a processor 114 and a database 116 configured to hold identifiers associated with the assembly machine 102 and receiving machine 106.

The application 112 of the assembly machine 102 can generate a component identifier for a component added to the item by the assembly machine 102. In a non-limiting example, the component may be a tire and the item may be a vehicle frame, wherein the assembly machine 102 applies the tire to the vehicle. In this non-limiting example, a component identifier may include, but is not limited to, source information about the tire, a distance traveled for the tire to arrive at the assembly location 104, carbon data associated with the tire, or a geographic location of the assembly location 104.

The application 112 of the receiving machine 106 can generate destination identifiers for the item. Continuing with the non-limiting example above, the destination identifier may include, but is not limited to, a geographic location of the vehicle when it arrives at a destination location (i.e., a warehouse or dealership), transportation information associated with traveling between destination locations, distance traveled between destination locations, carbon data associated with traveling between destination locations, date of a sale of the vehicle, a geographic location of the sale of the vehicle, an identifier of a buyer of the vehicle, or a price paid for the vehicle.

A distributed system comprises a plurality of nodes 118 communicating over a network 120. In an exemplary embodiment, each assembly machine 102 and receiving machine 106 includes at least one node 118 (i.e., a computer connected to the network) and can add blocks directly to the blockchain. Each node 118 in the system comprises a network interface, a control circuit, and a memory.

The control circuit may comprise a processor, a microprocessor, and the like and may be configured to execute computer-readable instructions stored on a computer-readable storage memory. The computer-readable storage memory may comprise volatile and/or non-volatile memory and have stored upon it a set of computer-readable instructions which, when executed by the control circuit, cause the node to update the blockchain stored in the memory based on communications with other nodes 118 over the network 120. In some embodiments, the control circuit may further be configured to extend the blockchain by processing updates to form new blocks for the blockchain. Generally, each node 118 may store a version of the blockchain (e.g., each node 118 has its own copy of the ledger), and together, may form a distributed database.

In an alternative embodiment, the assembly machine 102 and the receiving machine 106 are in communication with the data storage device storing database 110, via the communications network 120. The database 110 can be embodied as a master cryptographically verifiable ledger. The database 110 can be embodied as a blockchain storage system that is configured to store a blockchain record or a shared ledger. The database 110 is shared by all nodes 118 participating in a system. A node 118 can generate a new block in the database 110. The block can store records that can represent data associated with a component identifier or a destination identifier associated with the item. The node 118 can be configured to generate new blocks in the master blockchain record based on the operation of assembling and receiving the item.

In further embodiments, the system includes a server 122 configured to receive audit or recall alerts for a component of the item and/or the item itself. The server 122, which has received the alert, can access the transaction records in the blocks stored in the database 116. The server 122 can query the database 116 to identify the data associated with the component(s) and/or item(s) that is affected by the audit or recall. For example, the server 122 can verify whether an audited or recalled component was used in assembly of the item based on the transaction records. The server 122 can query the database 116 to confirm whether the data in the records corresponds with the recalled or audited components. In response to verification, the server 122 transmits a notification. In some embodiments, the node 118 can generate a new block in the database 116. The new block can contain new transaction records that represent data associated with the inventory affected by the recall or audit. In further embodiments, the item(s) affected by the audit or the recall can be automatically retrieved from storage, for example, in a warehouse.

In one embodiment, a user computing device 124 can query the database 116 to identify data associated with the item. The node 118 (e.g., a query server) receives, from the user computing device 124, a query associated with one or more components of the item and/or one or more destination locations. In response to the query, the node 118 retrieves, from a cryptographically verifiable ledger, one or more component identifiers and/or one or more destination identifiers associated with the query. The node 118 transmits the one or more component identifiers and/or the one or more destination identifiers to the user computing device 124.

In an example embodiment, one or more portions of the communications network 120 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

As a non-limiting example, system 100 can be implemented in an assembly and distribution environment. For example, system 100 can be used when assembling and transporting physical items, such as products sold at a retail store and/or an e-commerce website. For example, transporting the physical items may include shipping of products from a factory to a warehouse to a retail store to a customer.

Although FIG. 1 depicts one assembly machine 102, one assembly location 104, one receiving machine 106, and one receiving location 108, exemplary embodiments of the system 100 can include any number of assembly machines 102, assembly locations 104, receiving machines 106, and receiving locations 108 as needed within the assembly chain and supply chain. For example, multiple assembly machines can be used to assemble an item (e.g., in an assembly line arrangement) and each assembly machine can create events and data that are added to the block chain before the product is transported to the next destination location at which additional receiving/assembly machines may continue to add or integrate components to the item or incorporate the item into another item, which can result in additional blocks being added to the blockchain.

Figure 2:
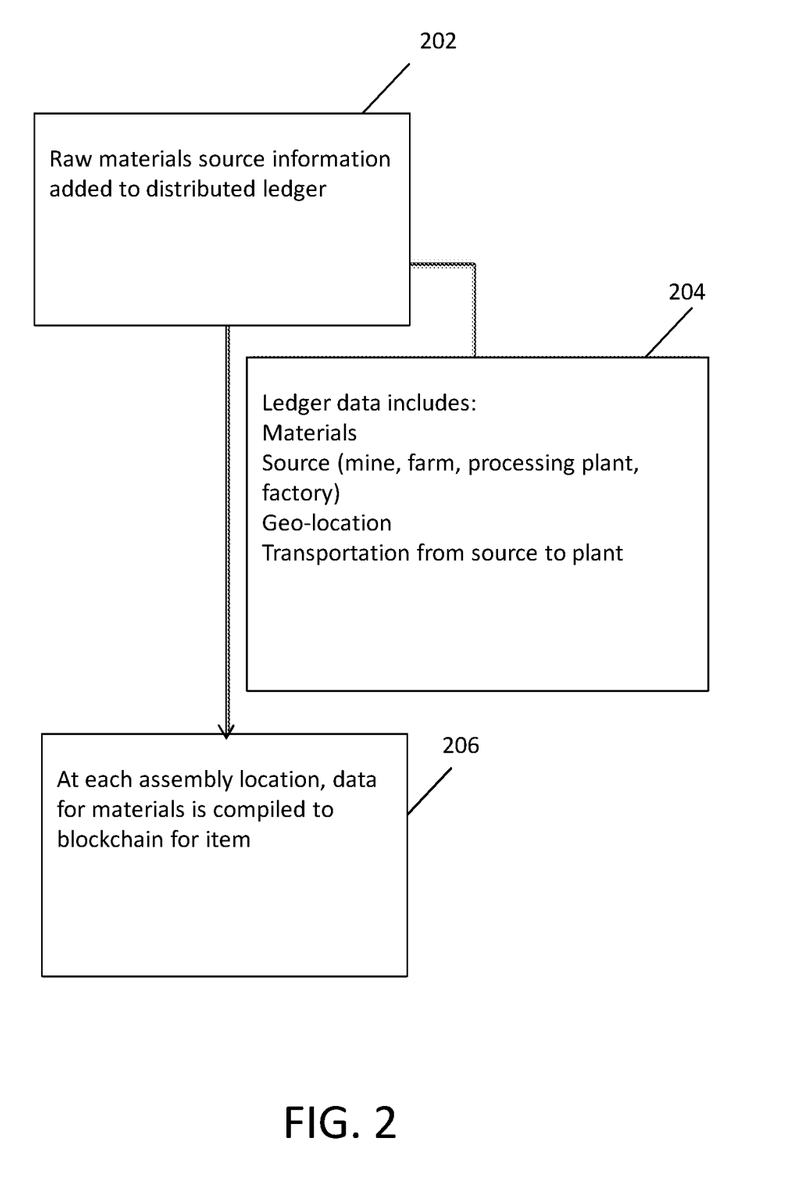
FIG. 2 illustrates a method for tracking an item through an assembly chain in accordance with an exemplary embodiment.

FIG. 2 illustrates a method for tracking an item through an assembly chain, in accordance with an exemplary embodiment. At operation 202, at least one assembly machine (e.g., assembly machine 102) adds, via a node (e.g., node 118), component identifiers (for example, raw material source information) for an item to a first distributed cryptographically verifiable ledger. As shown at operation 204, the ledger data may include, but is not limited to, materials, source information, geo-location, and transportation from a source location to a plant. At operation 206, at each assembly location, data associated with the component identifiers are compiled into a first blockchain for the item.

The component identifiers can include at least one of an identifier of a component or a raw material associated with the item, an amount of a raw material included in the item, distance traveled for a component or a raw material to arrive at an assembly location, transportation information from a source of a component or a raw material to an assembly location, carbon data associated with a component or a raw material, source information for a component or a raw material, or a geographic location of an assembly location.

Figure 3:
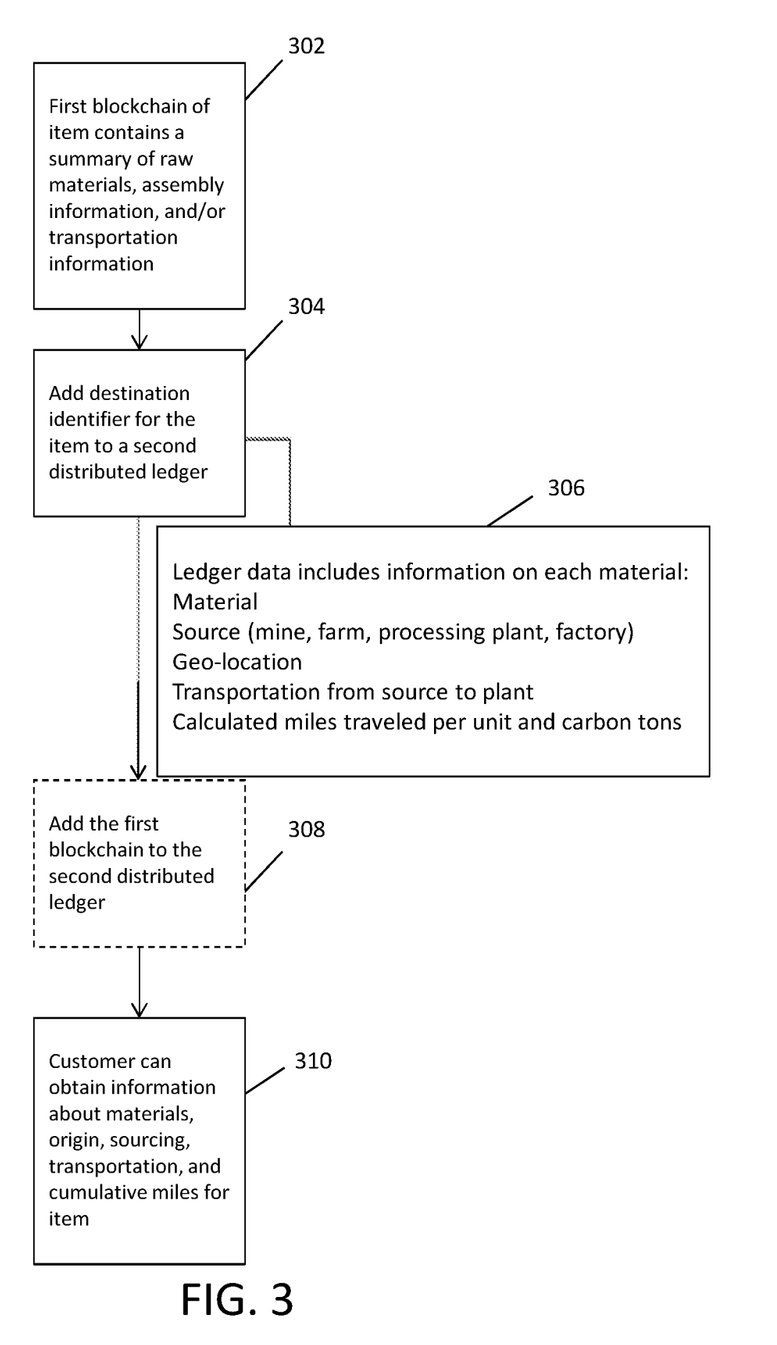
FIG. 3 illustrates a method for tracking an item through a supply chain in accordance with an exemplary embodiment.

FIG. 3 illustrates a method for tracking the item through a supply chain, in accordance with an exemplary embodiment. At operation 302, the first distributed cryptographically verifiable ledger of the item contains a summary of the component information. At operation 304, at least one receiving machine (e.g., receiving machine 106) adds, via a node (e.g., a node 118), a destination identifier for the item and a hash to a second distributed cryptographically verifiable ledger. As shown at operation 306, the ledger data may include, but is not limited to, materials, source information, geo-location, transportation from source to plant, calculated miles traveled per unit, and carbon data. At operation 308, the receiving machine may add, via a node, the first blockchain from FIG. 2 to the second cryptographically verifiable ledger. At operation 310, a customer can obtain information about, for example, materials, origin, sourcing, transportation, carbon, and cumulative miles for the item using the second ledger.

The destination identifiers can include at least one of a geographic location of a destination location, transportation information associated with traveling between destination locations, a distance traveled between destination locations, carbon data associated with traveling between destination locations, a date of a sale of the item, a geographic location of the sale of the item, an identifier of a buyer of the item, or a price paid for the item.

Descriptions of some embodiments of blockchain technology are provided with reference to FIG. 4-9 herein. In embodiments described herein, blockchains may be utilized to record component identifiers and destination identifiers. One or more of the assembly machine, receiving machine, central computing server/system, or user device described herein may comprise a node in a distributed blockchain system storing a copy of the blockchain record. Updates to the blockchain(s) are prompted by adding, autonomously by an assembly machine at an assembly location within an assembly chain, a component to an item, and/or by receiving, by a receiving machine at a destination location within a supply chain, the item, and one or more nodes on the system may be configured to incorporate one or more updates into blocks to add to the distributed database.

Distributed database and shared ledger database generally refer to methods of peer-to-peer record keeping and authentication in which records are kept at multiple nodes in the peer-to-peer network instead of kept at a central trusted party. A blockchain may generally refer to a distributed database that maintains a growing list of records in which each block contains a hash of some or all previous records in the chain to secure the record from tampering and unauthorized revision. A hash generally refers to a derivation of original data. In some embodiments, the hash in a block of a blockchain may comprise a cryptographic hash that is difficult to reverse and/or a hash table. Blocks in a blockchain may further be secured by a system involving one or more of a distributed timestamp server, cryptography, public/private key authentication and encryption, proof standard (e.g. proof-of-work, proof-of-stake, proof-of-space), and/or other security, consensus, and incentive features. In some embodiments, a block in a blockchain may comprise one or more of a data hash of the previous block, a timestamp, a cryptographic nonce, a proof standard, and a data descriptor to support the security and/or incentive features of the system.

In some embodiments, embodiments of the system can include a plurality of nodes (e.g., assembly machines 102 and receiving machine 106 each include at least one node 118) configured to generate computational proof of record integrity and the chronological order of its use for content through a peer-to-peer network. In some embodiments, when a blockchain is updated in embodiments of the system, a node in the distributed environment takes a hash of a block of items to be timestamped and broadcasts the hash to other nodes on the peer-to-peer network. The timestamp in the block serves to prove that the data existed at the time in order to get into the hash. In some embodiments, each block includes the previous timestamp in its hash, forming a chain, with each additional block reinforcing the ones before it. In some embodiments, the network of timestamp server nodes performs the following steps to add a block to a chain: 1) new activities are broadcasted to all nodes, 2) each node collects new activities into a block, 3) each node works on finding a difficult proof-of-work for its block, 4) when a node finds a proof-of-work, it broadcasts the block to all nodes, 5) nodes accept the block only if activities are authorized, and 6) nodes express their acceptance of the block by working on creating the next block in the chain, using the hash of the accepted block as the previous hash. In some embodiments, nodes may be configured to consider the longest chain to be the correct one and work on extending it.

Figure 4:
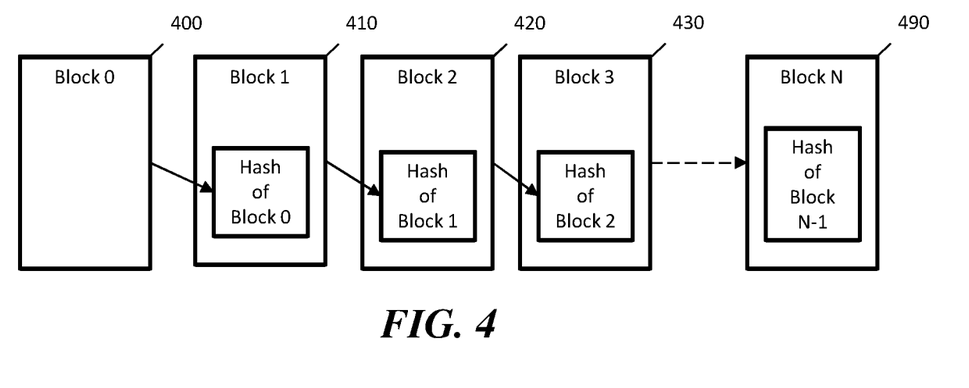
FIG. 4 comprises an illustration of blocks as configured in accordance with various embodiments of the present disclosure.

FIG. 4 illustrates a blockchain according to some embodiments. In some embodiments, the blockchain of the assembly and distribution records created by embodiments of the system can include a hash chain or a hash tree in which each block added in the chain contains a hash of the previous block. In FIG. 4, block 0 400 represents a genesis block of the chain. Block 1 410 contains a hash of block 0 400, block 2 420 contains a hash of block 1 410, block 3 430 contains a hash of block 2 420, and so forth. Continuing down the chain, block N contains a hash of block N−1. In some embodiments, the hash may comprise the header of each block. Once a chain is formed, modifying or tampering with a block in the chain would cause detectable disparities between the blocks. For example, if block 1 is modified after being formed, block 1 would no longer match the hash of block 1 in block 2. If the hash of block 1 in block 2 is also modified in an attempt to cover up the change in block 1, block 2 would not then match with the hash of block 2 in block 3. In some embodiments, a proof standard (e.g. proof-of-work, proof-of-stake, proof-of-space, etc.) may be required by the system when a block is formed to increase the cost of generating or changing a block that could be authenticated by the consensus rules of the distributed system, making the tampering of records stored in a blockchain computationally costly and essentially impractical. In some embodiments, the blockchain(s) created by embodiments of the system may comprise a hash chain stored on multiple nodes as a distributed database and/or a shared ledger, such that modifications to any one copy of the chain would be detectable when the system attempts to achieve consensus prior to adding a new block to the chain.

In some embodiments, the blocks in the blockchains created by embodiments of the system may contain rules and data for authorizing different types of actions and/or parties who can take action. In some embodiments, transaction and block forming rules may be part of the software algorithm on each node. When a new block is being formed, any node on the system can use the prior records in the blockchain to verify whether the requested action is authorized.

Figure 5:
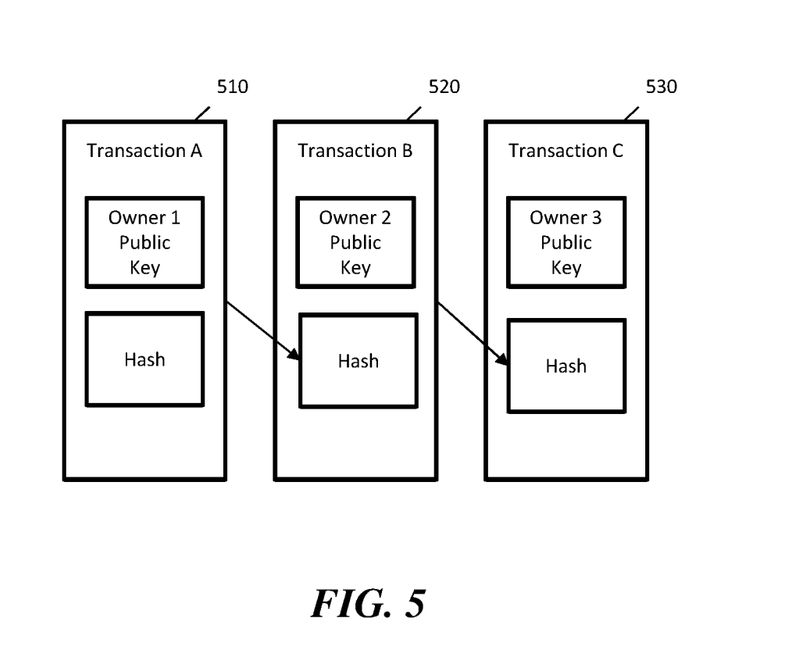
FIG. 5 comprises an illustration of transactions configured in accordance with various embodiments of the present disclosure.

FIG. 5 illustrates blockchain-based transactions according to some embodiments. In some embodiments, the blockchain illustrated in FIG. 5 comprises a hash chain protected by public key encryption (in some embodiments, private key encryption may also be used). As an example, Transaction A 510 represents a component identifier recorded in a block of a blockchain showing that a first assembly machine added the component to an item. Transaction A 510 contains the first assembly machine's public key and/or signature for the transaction and a hash of a previous block. When a second assembly machine adds a component to the item, a block containing transaction B 520 is formed. The record of transaction B 520 comprises a public key of the second assembly machine and a hash of the previous block. When a third assembly machine adds a component to the item, a block containing transaction C 530 is formed. The record of transaction C 530 comprises a public key of the third assembly machine and a hash of the previous block. In some embodiments, when each transaction record is created, the system may check previous transaction records and the current assembly machine's public key signature to determine whether the transaction is valid. In some embodiments, transactions are broadcasted in the peer-to-peer network and each node on the system may verify that the transaction is valid prior to adding the block containing the transaction to their copy of the blockchain. In some embodiments, nodes in the system may look for the longest chain in the system to determine the most up-to-date transaction record. The transactions in FIG. 5 are shown as an example only. In some embodiments, a blockchain record and/or the software algorithm may comprise any type of rules that regulate who and how the chain may be extended.

Figure 6:
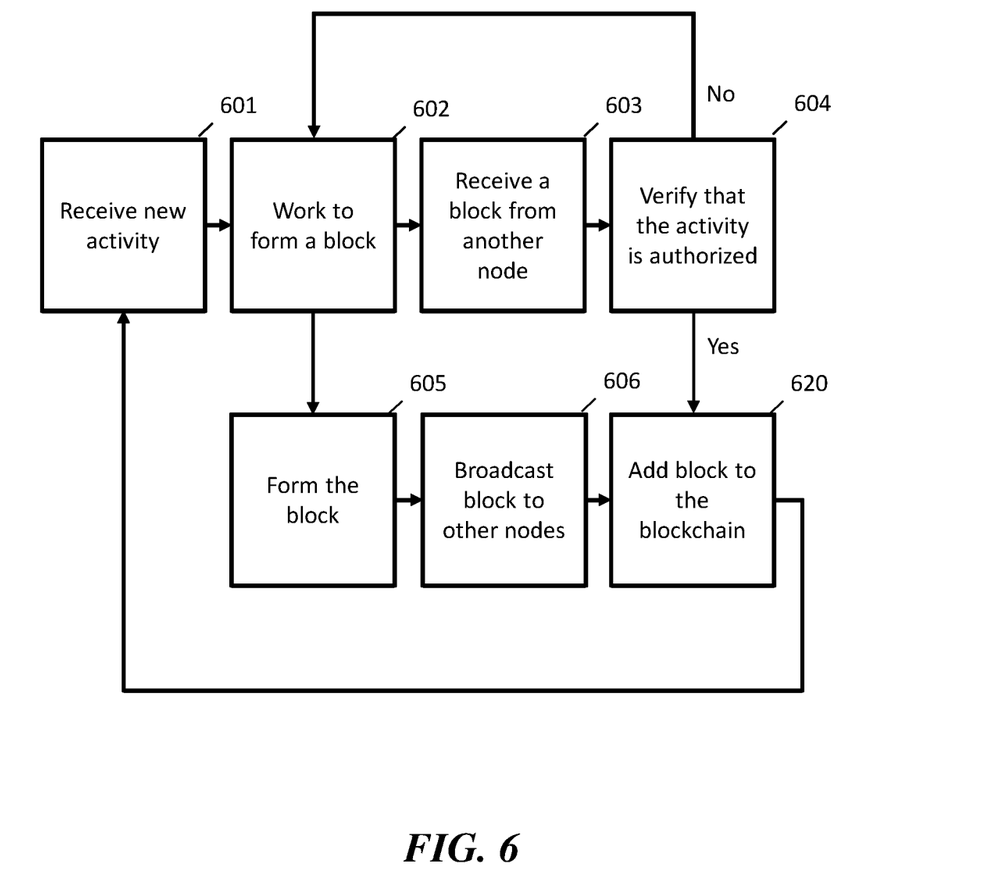
FIG. 6 comprises a flow diagram in accordance with various embodiments of the present disclosure.

FIG. 6 illustrates a flow diagram according to some embodiments. In some embodiments, the steps shown in FIG. 6 may be performed by a processor-based device, such as a computer system, a server, a distributed server, a timestamp server, a blockchain node, and the like. In some embodiments, the steps in FIG. 6 may be performed by one or more of the nodes in a system using blockchain for record keeping.

In step 601, a node receives a new activity. The new activity may comprise an update to the record being kept in the form of a blockchain. In some embodiments, for blockchain supported digital or physical asset record keeping, the new activity may comprise an asset transaction. In some embodiments, the new activity may be broadcasted to a plurality of nodes on the network prior to step 601. In step 602, the node works to form a block to update the blockchain. In some embodiments, a block may comprise a plurality of activities or updates and a hash of one or more previous blocks in the blockchain. In some embodiments, the system may comprise consensus rules for individual transactions and/or blocks and the node may work to form a block that conforms to the consensus rules of the system. In some embodiments, the consensus rules may be specified in the software program running on the node. For example, a node may be required to provide a proof standard (e.g. proof of work, proof of stake, etc.) which requires the node to solve a difficult mathematical problem for form a nonce in order to form a block. In some embodiments, the node may be configured to verify that the activity is authorized prior to working to form the block. In some embodiments, whether the activity is authorized may be determined based on records in the earlier blocks of the blockchain itself.

After step 602, if the node successfully forms a block in step 605 prior to receiving a block from another node, the node broadcasts the block to other nodes over the network in step 606. In some embodiments, in a system with incentive features, the first node to form a block may be permitted to add incentive payment to itself in the newly formed block. In step 620, the node then adds the block to its copy of the blockchain. In the event that the node receives a block formed by another node in step 603 prior to being able to form the block, the node works to verify that the activity recorded in the received block is authorized in step 604. In some embodiments, the node may further check the new block against system consensus rules for blocks and activities to verify whether the block is properly formed. If the new block is not authorized, the node may reject the block update and return to step 602 to continue to work to form the block. If the new block is verified by the node, the node may express its approval by adding the received block to its copy of the blockchain in step 620. After a block is added, the node then returns to step 601 to form the next block using the newly extended blockchain for the hash in the new block.

In some embodiments, in the event one or more blocks having the same block number is received after step 620, the node may verify the later arriving blocks and temporarily store these blocks if they pass verification. When a subsequent block is received from another node, the node may then use the subsequent block to determine which of the plurality of received blocks is the correct/consensus block for the blockchain system on the distributed database and update its copy of the blockchain accordingly. In some embodiments, if a node goes offline for a time period, the node may retrieve the longest chain in the distributed system, verify each new block added since it has been offline, and update its local copy of the blockchain prior to proceeding to step 601.

Figure 7:
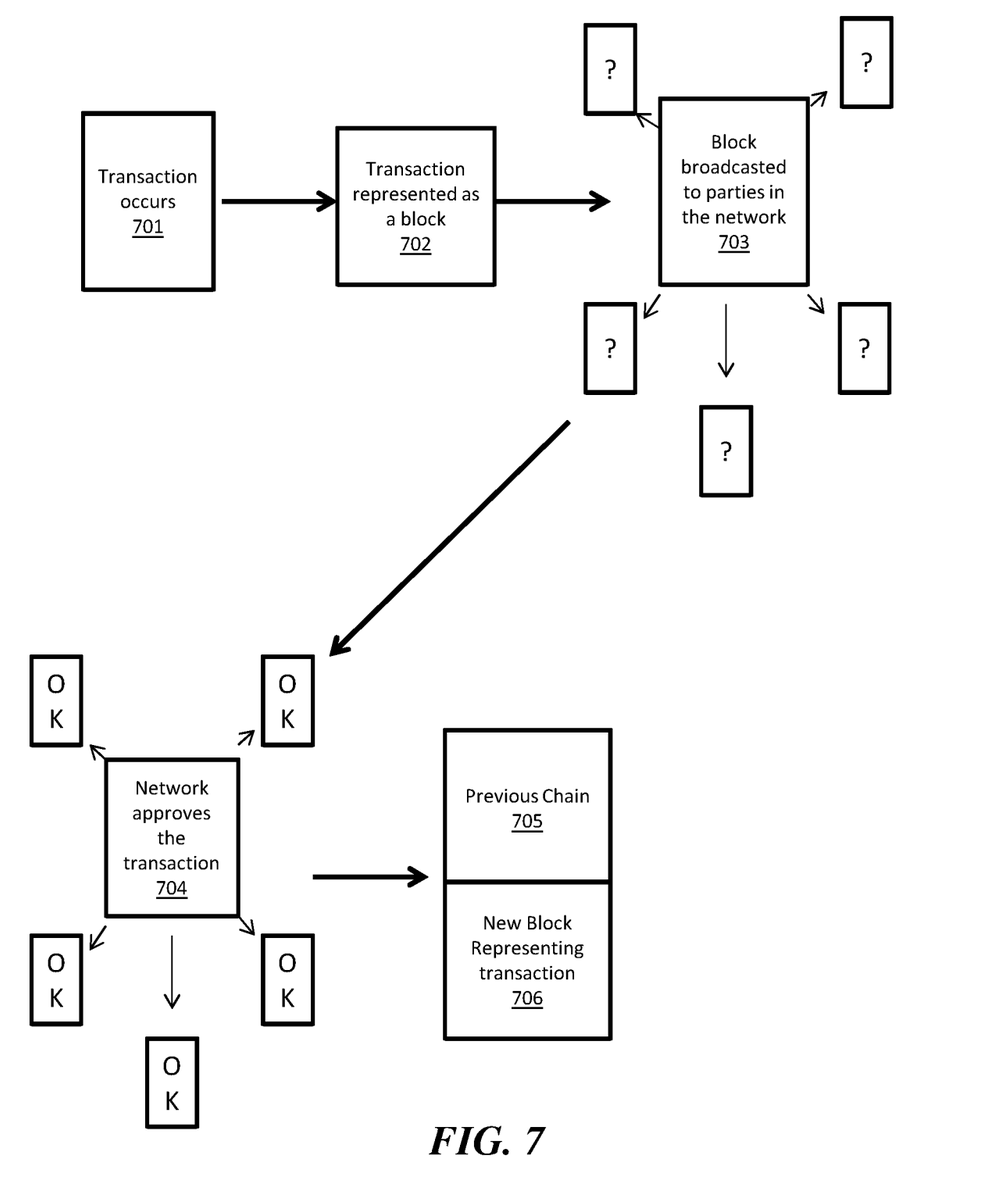
FIG. 7 comprises a process diagram as configured in accordance with various embodiments of the present disclosure.

FIG. 7 illustrates a process diagram of a blockchain update according to some implementations. In step 701, machine A adds a component to an item or receives the item at a destination location and generates an identifier (referred to as a transaction). In step 702, the transaction initiated in step 701 is represented as a block. In some embodiments, nodes may be required to satisfy proof-of-work by solving a difficult mathematical problem to form the block. In some embodiments, other methods of proof such as proof-of-stake, proof-of-space, etc. may be used in the system.

In step 703, the block is broadcasted to parties in the network. In step 704, nodes in the network approve the transaction by examining the block that contains the transaction. In some embodiments, the nodes may check the solution provided as proof-of-work to approve the block. In some embodiments, the nodes may check the transaction against the transaction record in the longest blockchain in the system to verify that the transaction is valid. In some embodiments, a block may be approved with consensus of the nodes in the network. After a block is approved, the new block 706 representing the transaction is added to the existing chain 705 comprising blocks that chronologically precede the new block 706. The new block 706 may contain the transaction(s) and a hash of one or more blocks in the existing chain 705. In some embodiments, each node may then update their copy of the blockchain with the new block and continue to work on extending the chain with additional transactions.

Figure 8:
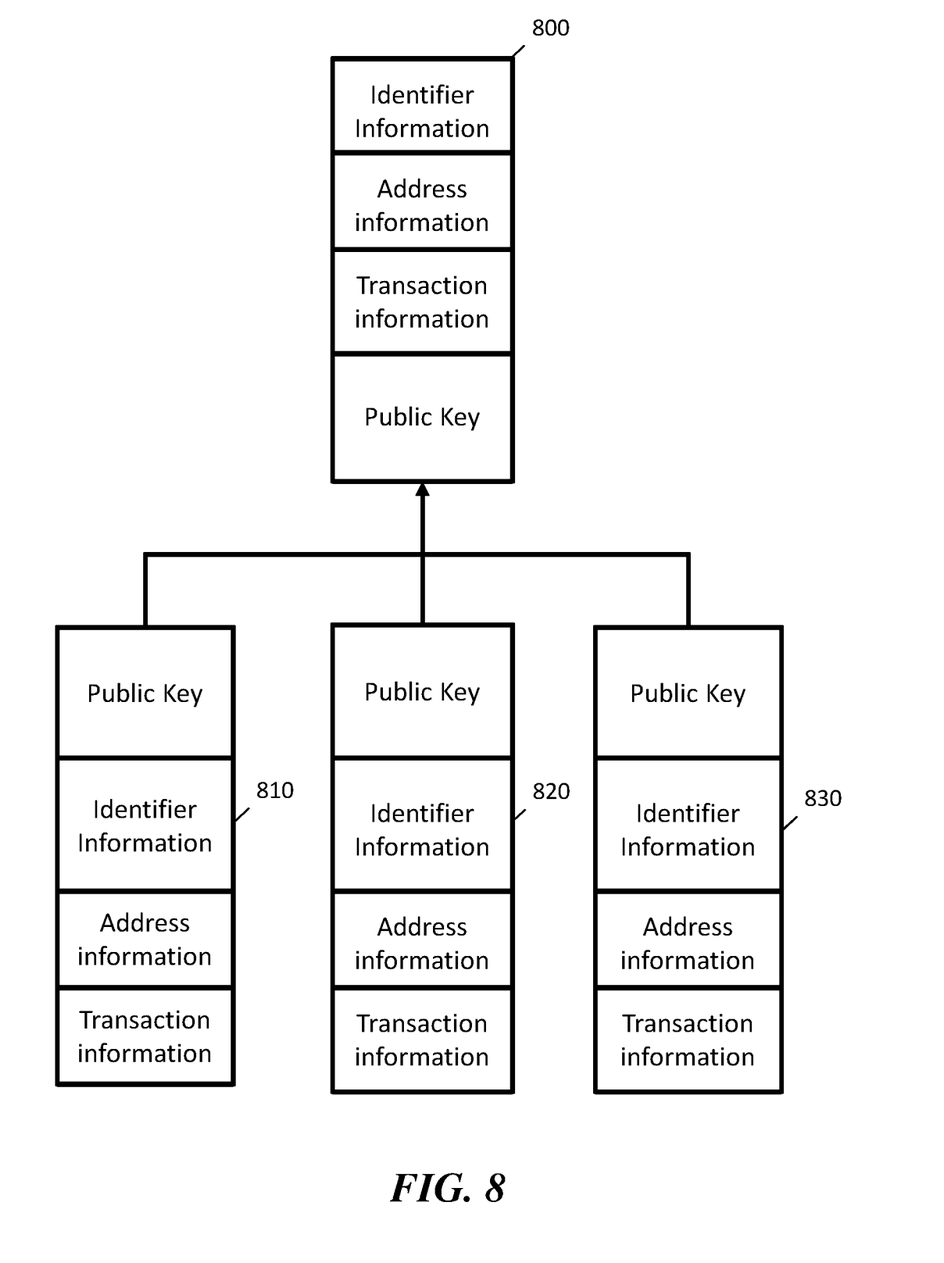
FIG. 8 comprises an illustration of a record configured in accordance with various embodiments of the present disclosure.

FIG. 8 illustrates a diagram of a blockchain according to some embodiments. FIG. 8 comprises an example of an implementation of a blockchain system for record keeping. The record 800 comprises identifier information, address information, transaction information, and a public key associated with an assembly machine or a receiving machine. In some embodiments, nodes associated with assembly machines and/or receiving machines may each store a copy of the delivery record 810, 820, and 830 respectively. The new transaction may be broadcasted and verified by the nodes on the system before being added to the distributed delivery record blockchain.

With the scheme shown in FIG. 8, the blockchain may be updated by one or more of the nodes to form a record of the transaction without a trusted third party while preventing unauthorized modifications to the record. With the distributed database and peer-to-peer verification of a blockchain system, users and customers can each have confidence in the authenticity and accuracy of the delivery record stored in the form of a blockchain.

Figure 9:
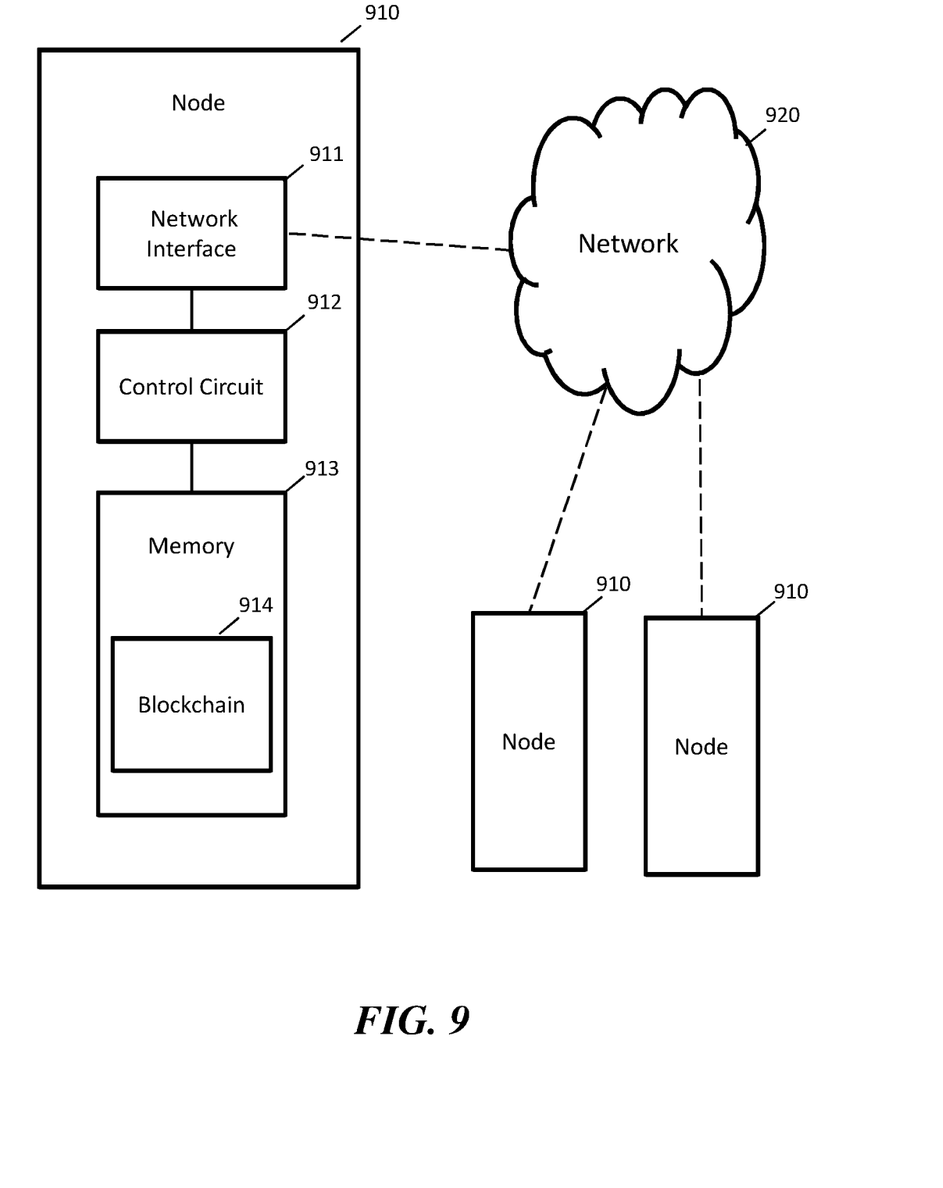
FIG. 9 comprises a system diagram configured in accordance with various embodiments of the present disclosure.

FIG. 9 illustrates a system according to some embodiments is shown. Embodiments of the system can include a plurality of nodes 910 communicating over a network 920. In some embodiments, the nodes 910 may comprise a distributed blockchain server and/or a distributed timestamp server. Each node 910 in the system comprises a network interface 911, a control circuit 912, and a memory 913.

The control circuit 912 may comprise a processor, a microprocessor, and the like and may be configured to execute computer-readable instructions stored on a computer-readable storage memory 913. The computer-readable storage memory may comprise volatile and/or non-volatile memory and have stored upon it a set of computer-readable instructions which, when executed by the control circuit 912, cause the node 910 to update the blockchain 914 stored in the memory 913 based on communications with other nodes 910 over the network 920. In some embodiments, the control circuit 912 may further be configured to extend the blockchain 914 by processing updates to form new blocks for the blockchain 914. Generally, each node may store a version of the blockchain 914, and together, may form a distributed database. In some embodiments, each node 910 may be configured to perform one or more steps described with reference to FIGS. 6-7 herein.

The network interface 911 may comprise one or more network devices configured to allow the control circuit to receive and transmit information via the network 920. In some embodiments, the network interface 911 may comprise one or more of a network adapter, a modem, a router, a data port, a transceiver, and the like. The network 920 may comprise a communication network configured to allow one or more nodes 910 to exchange data. In some embodiments, the network 920 may comprise one or more of the Internet, a local area network, a private network, a virtual private network, a home network, a wired network, a wireless network, and the like. In some embodiments, the system does not include a central server and/or a trusted third party system. Each node in the system may enter and leave the network at any time.

With the system and processes shown herein, once a block is formed, the block cannot be changed without redoing the work to satisfy census rules thereby securing the block from tampering. A malicious attacker would need to provide proof standard for each block subsequent to the one he/she seeks to modify, race all other nodes, and overtake the majority of the system to affect change to an earlier record in the blockchain.

In some embodiments, in the peer-to-peer network, the longest chain proves the sequence of events witnessed, proves that it came from the largest pool of processing power, and that the integrity of the document has been maintained. In some embodiments, the network for supporting blockchain-based record keeping requires minimal structure. In some embodiments, messages for updating the record are broadcast on a best-effort basis. Nodes can leave and rejoin the network at will and may be configured to accept the longest proof-of-work chain as proof of what happened while they were away.

Figure 10:
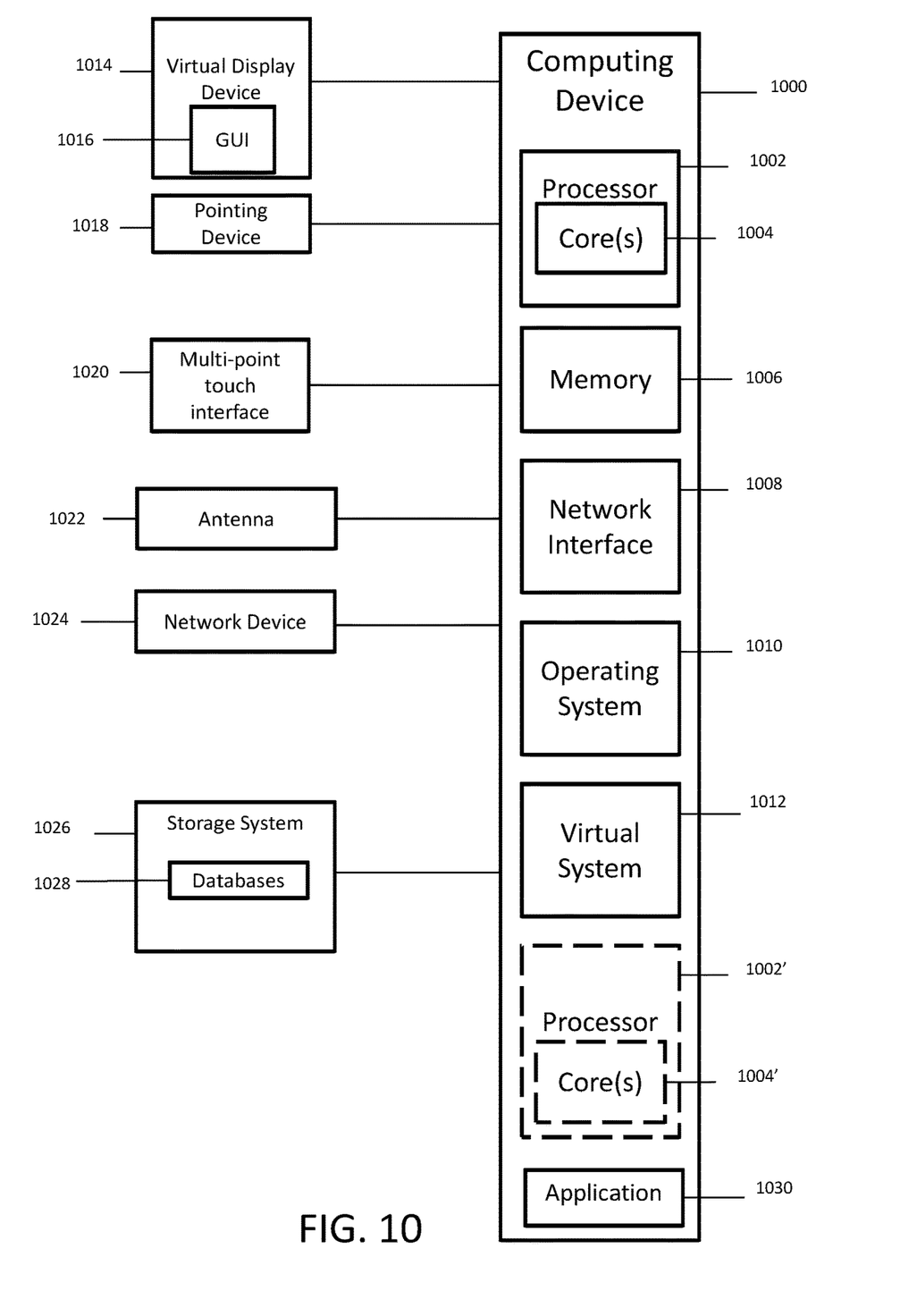
FIG. 10 depicts a block diagram of an exemplary computing device in accordance with an exemplary embodiment.

FIG. 10 is a block diagram of an example computing device 1000 for implementing exemplary embodiments of the present disclosure. For example, the computing device 1000 can be embodied as a portion of an assembly machine and/or a receiving machine. The computing device 1000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 1006 included in the computing device 1000 may store computer-readable and computer-executable instructions or software (e.g., applications 112) for implementing exemplary operations of the computing device 1000. The computing device 1000 also includes configurable and/or programmable processor 1002 and associated core(s) 1004, and optionally, one or more additional configurable and/or programmable processor(s) 1002' and associated core(s) 1004' (for example, in the case of computer systems having multiple processors/cores), for executing computer-readable and computer-executable instructions or software stored in the memory 1006 and other programs for implementing exemplary embodiments of the present disclosure. Processor 1002 and processor(s) 1002' may each be a single core processor or multiple core (1004 and 1004') processor. Either or both of processor 1002 and processor(s) 1002' may be configured to execute one or more of the instructions described in connection with computing device 1000.

Virtualization may be employed in the computing device 1000 so that infrastructure and resources in the computing device 1000 may be shared dynamically. A virtual machine 1012 may be provided to handle a process running on multiple processors so that the process appears to be using only one computing resource rather than multiple computing resources. Multiple virtual machines may also be used with one processor.

Memory 1006 may include a computer system memory or random access memory, such as DRAM, SRAM, EDO RAM, and the like. Memory 1006 may include other types of memory as well, or combinations thereof. A user may interact with the computing device 1000 through a visual display device 1014, such as a computer monitor, which may display one or more graphical user interfaces 1016, multi touch interface 1020 and a pointing device 1018.

The computing device 1000 may also include one or more storage devices 1026, such as a hard-drive, CD-ROM, or other computer-readable media, for storing data and computer-readable instructions and/or software that implement exemplary embodiments of the present disclosure (e.g., application 112). For example, exemplary storage device 1026 can include one or more databases 1028 for storing information associated with item. The databases 1028 may be updated manually or automatically at any suitable time to add, delete, and/or update one or more data entries in the databases.

The computing device 1000 can include a network interface 1008 configured to interface via one or more network devices 1024 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, a central computing system or central computing server can include one or more antennas 1022 to facilitate wireless communication (e.g., via the network interface) between the computing device 1000 and a network and/or between the computing device 1000 and other computing devices. The network interface 1008 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein.

The computing device 1000 may run any operating system 1010, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 1000 and performing the operations described herein. In exemplary embodiments, the operating system 1010 may be run in native mode or emulated mode. In an exemplary embodiment, the operating system 1010 may be run on one or more cloud machine instances.

Figure 11:
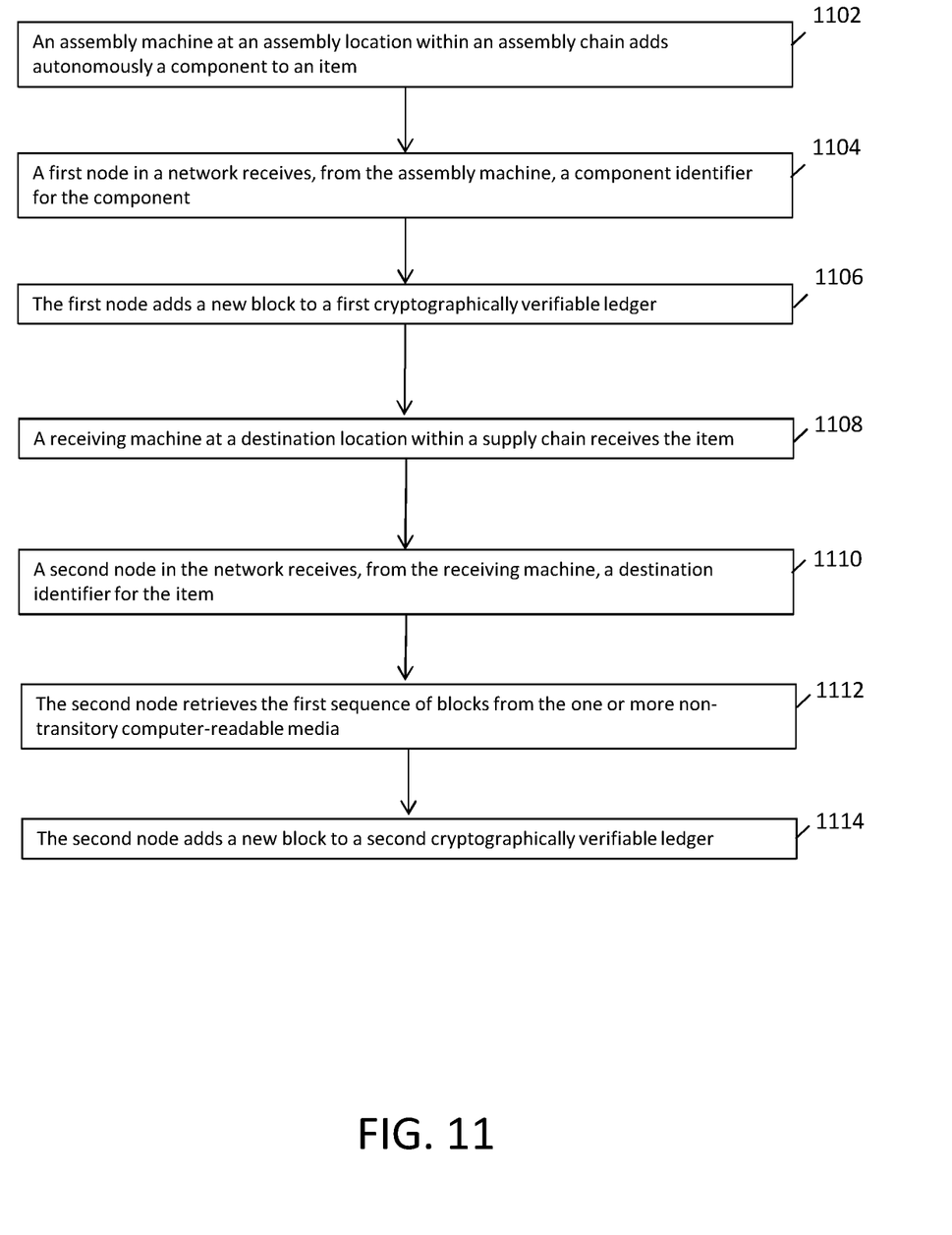
FIG. 11 illustrates a method for tracking an item in a distributed environment in accordance with an exemplary embodiment.

FIG. 11 illustrates a method for tracking an item in a distributed environment, in accordance with an exemplary embodiment. At operation 1102, an assembly machine at an assembly location within an assembly chain adds autonomously a component to an item. At operation 1104, a first node in a network receives, from the assembly machine, a component identifier for the component. At operation 1106, the first node adds a new block to a first cryptographically verifiable ledger represented by a first sequence of blocks that is stored in one or more non-transitory computer-readable media. The new block added to the first cryptographically verifiable ledger contains the component identifier and a hash of a previous block in the first sequence of blocks. At operation 1108, a receiving machine at a destination location within a supply chain receives the item. At operation 1110, a second node in the network receives, from the receiving machine, a destination identifier for the item. At operation 1112, the second node retrieves the first sequence of blocks from the one or more non-transitory computer-readable media. At operation 1114, the second node adds a new block to a second cryptographically verifiable ledger represented by a second sequence of blocks that is stored in the one or more non-transitory computer-readable media. The new block added to the second cryptographically verifiable ledger contains the destination identifier, the first sequence of blocks, and/or a hash of a previous block in the second sequence of blocks.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A method for tracking an item in a distributed environment, the method comprising:
    adding, autonomously by an assembly machine at an assembly location within an assembly chain, a physical component to a physical item, the physical component being integrated with or applied to the physical item during assembly;
    receiving, by a first node in a network from the assembly machine, a component identifier for the physical component;
    adding, by the first node, a new block to a first cryptographically verifiable ledger represented by a first sequence of blocks that is stored in one or more non-transitory computer-readable media, the new block added to the first cryptographically verifiable ledger containing the component identifier and a hash of a previous block in the first sequence of blocks;
    receiving, by a receiving machine at a destination location within a supply chain, the physical item;
    receiving, by a second node in the network from the receiving machine, a destination identifier for the physical item;
    retrieving, by the second node, the first sequence of blocks from the one or more non-transitory computer-readable media; and
    adding, by the second node, a new block to a second cryptographically verifiable ledger represented by a second sequence of blocks that is stored in the one or more non-transitory computer-readable media, the new block added to the second cryptographically verifiable ledger containing the destination identifier, the first sequence of blocks, and a hash of a previous block in the second sequence of blocks.

2. The method of claim 1, wherein the component identifier includes at least one of an identifier of a component or a raw material associated with the item, an amount of a raw material included in the item, distance traveled for a component or a raw material to arrive at an assembly location, transportation information from a source of a component or a raw material to an assembly location, carbon data associated with a component or a raw material, source information for a component or a raw material, or a geographic location of an assembly location.

3. The method of claim 1, wherein the destination identifier includes at least one of a geographic location of a destination location, transportation information associated with traveling between destination locations, a distance traveled between destination locations, carbon data associated with traveling between destination locations, a date of a sale of the item, a geographic location of the sale of the item, an identifier of a buyer of the item, or a price paid for the item.

4. The method of claim 1, wherein the supply chain includes at least one of a distribution center, a warehouse, a store, or a checkout register at the store.

5. The method of claim 1, wherein the assembly machine is an autonomous computing device within a manufacturing line, the autonomous computing device controlling an amount of a component or a raw material added to the item.

6. The method of claim 1, further comprising:
    receiving, by a query server from a user computing device, a query associated with one or more components of the item;
    in response to the query, retrieving, by the query server from the second cryptographically verifiable ledger, one or more component identifiers associated with the query; and
    transmitting, by the query server, the one or more component identifiers to the user computing device.

7. The method of claim 1, further comprising:
    receiving, by a query server from a user computing device, a query associated with one or more destination locations;
    in response to the query, retrieving, by the query server from the second cryptographically verifiable ledger, one or more destination identifiers associated with the query; and
    transmitting, by the query server, the one or more destination identifiers to the user computing device.

8. A system comprising:
    one or more computer-readable media;
    at least one assembly machine associated with at least one assembly location within an assembly chain, each assembly machine configured to add a physical component to a physical item, the physical component being integrated with or applied to the physical item during assembly;
    at least one receiving machine associated with at least one destination location within a supply chain, each receiving machine configured to receive the physical item at a destination location; and
    at least one node in a network, the at least one node being operatively coupled to the one or more computer-readable media, at least one assembly machine, and at least one receiving machine, the at least one node configured to:
        receive, from the at least one assembly machine, a component identifier for a physical component added to the physical item by the at least one assembly machine;
        add a new block to a first cryptographically verifiable ledger represented by a first sequence of blocks that is stored in one or more non-transitory computer-readable media, the new block added to the first cryptographically verifiable ledger containing the component identifier and a hash of a previous block in the first sequence of blocks;
        receive, from the at least one receiving machine, a destination identifier for the physical item;
        retrieve, from the one or more non-transitory computer-readable media, the first sequence of blocks; and
        add a new block to a second cryptographically verifiable ledger represented by a second sequence of blocks that is stored in the one or more non-transitory computer-readable media, the new block added to the second cryptographically verifiable ledger containing the destination identifier, the first sequence of blocks, and a hash of a previous block in the second sequence of blocks.

9. The system of claim 8, wherein the component identifier includes at least one of an identifier of a component or a raw material associated with the item, an amount of a raw material included in the item, distance traveled for a component or a raw material to arrive at an assembly location, transportation information from a source of a component or a raw material to an assembly location, carbon data associated with a component or a raw material, source information for a component or a raw material, or a geographic location of an assembly location.

10. The system of claim 8, wherein the destination identifiers includes at least one of a geographic location of a destination location, transportation information associated with traveling between destination locations, distance traveled between destination locations, carbon data associated with traveling between destination locations, date of a sale of the item, a geographic location of the sale of the item, an identifier of a buyer of the item, or a price paid for the item.

11. The system of claim 8, wherein the supply chain includes at least one of a distribution center, a warehouse, a store, or a checkout at the store.

12. The system of claim 8, wherein the assembly machine is an autonomous computing device within a manufacturing line, the autonomous computing device controlling an amount of a component or a raw material added to the item.

13. The system of claim 8, wherein the at least one node is further configured to:
receive, from a user computing device, a query associated with one or more components of the item;
in response to the query, retrieve, from the second cryptographically verifiable ledger, one or more component identifiers associated with the query; and
transmit the one or more component identifiers to the user computing device.

14. The system of claim 8, wherein the at least one node is further configured to:
receive, from a user computing device, a query associated with one or more destination locations;
in response to the query, retrieve, from the second cryptographically verifiable ledger, one or more destination identifiers associated with the query; and
transmit the one or more destination identifiers to the user computing device.

15. A non-transitory computer-readable medium storing instructions that when executed by a processing device cause the processing device to:
receive, from an assembly machine at an assembly location within an assembly chain, a component identifier for a physical component added to a physical item, the physical component being integrated with or applied to the physical item during assembly;
add a new block to a first cryptographically verifiable ledger represented by a first sequence of blocks that is stored in one or more non-transitory computer-readable media, the new block added to the first cryptographically verifiable ledger containing the component identifier and a hash of a previous block in the first sequence of blocks;
receive, from a receiving machine at a destination location within a supply chain, a destination identifier for the physical item;
retrieve, from the one or more non-transitory computer-readable media, the first sequence of blocks; and
add a new block to a second cryptographically verifiable ledger represented by a second sequence of blocks that is stored in the one or more non-transitory computer-readable media, the new block added to the second cryptographically verifiable ledger containing the destination identifier, the first sequence of blocks, and a hash of a previous block in the second sequence of blocks.

16. The medium of claim 15, wherein the component identifiers includes at least one of an identifier of a component or a raw material associated with the item, an amount of a raw material included in the item, distance traveled for a component or a raw material to arrive at an assembly location, transportation information from a source of a component or a raw material to an assembly location, carbon data associated with a component or a raw material, source information for a component or a raw material, or a geographic location of an assembly location.

17. The medium of claim 15, wherein the destination identifier includes at least one of a geographic location of a destination location, transportation information associated with traveling between destination locations, distance traveled between destination locations, carbon data associated with traveling between destination locations, date of a sale of the item, a geographic location of the sale of the item, an identifier of a buyer of the item, or a price paid for the item.

18. The medium of claim 15, wherein the supply chain includes at least one of a distribution center, a warehouse, a store, or a checkout at the store.

19. The medium of claim 15, wherein the assembly machine is an autonomous computing device within a manufacturing line, the autonomous computing device controlling an amount of a component or a raw material added to the item.

20. The medium of claim 15, wherein execution of the instructions causes the processing device to:
receive, from a user computing device, a query associated with one or more components of the item;
in response to the query, retrieve, from the second cryptographically verifiable ledger, one or more component identifiers associated with the query; and
transmit the one or more component identifiers to the user computing device.

21. The medium of claim 15, wherein execution of the instructions causes the processing device to:
receive, from a user computing device, a query associated with one or more destination locations;
in response to the query, retrieve, from the second cryptographically verifiable ledger, one or more destination identifiers associated with the query; and
transmit the one or more destination identifiers to the user computing device.

* * * * *